United States Patent
Atungsiri et al.

(10) Patent No.: US 11,956,688 B2
(45) Date of Patent: Apr. 9, 2024

(54) TELECOMMUNICATIONS APPARATUS AND METHODS

(71) Applicant: Sony Corporation, Tokyo (JP)

(72) Inventors: Samuel Asangbeng Atungsiri, Basingstoke (GB); Yuxin Wei, Basingstoke (GB); Vivek Sharma, Basingstoke (GB)

(73) Assignee: SONY CORPORATION, Tokyo (JP)

(*) Notice: Subject to any disclaimer, the term of this patent is extended or adjusted under 35 U.S.C. 154(b) by 420 days.

(21) Appl. No.: 17/275,199

(22) PCT Filed: Aug. 19, 2019

(86) PCT No.: PCT/EP2019/072142
§ 371 (c)(1),
(2) Date: Mar. 11, 2021

(87) PCT Pub. No.: WO2020/064219
PCT Pub. Date: Apr. 2, 2020

(65) Prior Publication Data
US 2022/0060959 A1 Feb. 24, 2022

(30) Foreign Application Priority Data
Sep. 24, 2018 (EP) .................................. 18196379

(51) Int. Cl.
*H04W 24/00* (2009.01)
*H04W 4/02* (2018.01)
(Continued)

(52) U.S. Cl.
CPC ........... *H04W 36/32* (2013.01); *H04W 4/023* (2013.01); *H04W 64/006* (2013.01); *H04W 84/06* (2013.01)

(58) Field of Classification Search
CPC ... H04W 36/32; H04W 4/023; H04W 64/006; H04W 84/06
(Continued)

(56) References Cited

U.S. PATENT DOCUMENTS

| 4,262,356 | A | * | 4/1981 | Lautier | ............... | H04B 7/2048 |
| | | | | | | 370/324 |
| 6,195,555 | B1 | * | 2/2001 | Dent | ..................... | H04W 68/00 |
| | | | | | | 455/456.2 |

(Continued)

FOREIGN PATENT DOCUMENTS

| WO | 2018/080606 A1 | 5/2018 |
| WO | 2019/201808 A1 | 10/2019 |

OTHER PUBLICATIONS

International Search Report and Written Opinion dated Nov. 13, 2019, received for PCT Application PCT/EP2019/072142 Filed on Aug. 19, 2019, 8 pages.

(Continued)

*Primary Examiner* — Amancio Gonzalez
(74) *Attorney, Agent, or Firm* — XSENSUS LLP

(57) ABSTRACT

A method of operating a terminal device in a wireless telecommunications system comprising the terminal device and a non-terrestrial network access node, wherein the method comprises the terminal device performing the steps of: determining a first location for the terminal device transmitting signalling indicating the first location; determining a second location for the terminal device; determining whether or not a distance between the first location and the second location is more than a predefined threshold distance, and if so transmitting signalling indicating the second location.

18 Claims, 7 Drawing Sheets

(51) Int. Cl.
*H04W 36/32* (2009.01)
*H04W 64/00* (2009.01)
*H04W 84/06* (2009.01)

(58) Field of Classification Search
USPC .................................................. 455/456.1
See application file for complete search history.

(56) References Cited

U.S. PATENT DOCUMENTS

| | | | | |
|---|---|---|---|---|
| 6,654,686 | B2* | 11/2003 | Kimura | G01S 19/256 |
| | | | | 701/484 |
| 7,324,465 | B2* | 1/2008 | Lim | H04B 7/18558 |
| | | | | 370/347 |
| 7,369,633 | B2* | 5/2008 | Jiang | H04L 27/2272 |
| | | | | 704/503 |
| 7,970,947 | B1* | 6/2011 | Frank | H04W 28/06 |
| | | | | 709/249 |
| 8,655,378 | B1* | 2/2014 | Crossno | H04W 4/027 |
| | | | | 455/456.6 |
| 8,903,417 | B2* | 12/2014 | Takahashi | H04M 1/72457 |
| | | | | 455/456.3 |
| 9,244,146 | B2* | 1/2016 | Rowitch | G01S 1/02 |
| 9,355,231 | B2* | 5/2016 | Disraeli | H04L 63/083 |
| 9,622,177 | B2* | 4/2017 | Jarosinski | G06F 1/3215 |
| 9,881,322 | B2* | 1/2018 | Turner | H04L 51/10 |
| 10,210,764 | B2* | 2/2019 | Weisbrod | H04W 72/542 |
| 10,326,689 | B2* | 6/2019 | Liu | H04W 40/16 |
| 10,419,103 | B1* | 9/2019 | Perdew | H04L 45/02 |
| 10,432,297 | B2* | 10/2019 | Lucky | H04B 7/2041 |
| 10,574,345 | B2* | 2/2020 | Lucky | H04B 7/18567 |
| 10,585,431 | B2* | 3/2020 | Golgiri | B62D 15/0285 |
| 10,784,954 | B2* | 9/2020 | Becker | H04B 7/18543 |
| 10,791,607 | B1* | 9/2020 | Modestine | H05B 47/105 |
| 10,871,379 | B2* | 12/2020 | Johnson | G16H 40/63 |
| 10,871,574 | B2* | 12/2020 | Garcia | G01S 19/23 |
| 10,901,093 | B2* | 1/2021 | Garcia | H04K 3/90 |
| 10,924,977 | B2* | 2/2021 | Kumar | H04W 76/20 |
| 10,935,667 | B2* | 3/2021 | Hoshi | G01S 19/42 |
| 11,074,617 | B2* | 7/2021 | Patil | B60W 40/08 |
| 11,080,649 | B2* | 8/2021 | Kim | H04L 43/08 |
| 11,343,857 | B2* | 5/2022 | Taherzadeh Boroujeni | |
| | | | | H04W 74/004 |
| 11,483,065 | B2* | 10/2022 | Atungsiri | H04B 7/2041 |
| 11,662,218 | B2* | 5/2023 | Johnson | G01C 21/3632 |
| | | | | 701/500 |
| 11,690,532 | B2* | 7/2023 | Johnson | G01S 19/42 |
| | | | | 701/469 |
| 2003/0158662 | A1* | 8/2003 | Kimura | G01S 19/05 |
| | | | | 701/470 |
| 2004/0014452 | A1* | 1/2004 | Lim | H04W 74/006 |
| | | | | 455/450 |
| 2004/0252229 | A1* | 12/2004 | Jiang | H04L 7/048 |
| | | | | 725/135 |
| 2004/0252655 | A1* | 12/2004 | Lim | H04B 7/216 |
| | | | | 370/321 |
| 2010/0026551 | A1* | 2/2010 | Szwilski | B61K 9/08 |
| | | | | 342/357.34 |
| 2014/0379255 | A1* | 12/2014 | Johnson | A61B 5/7405 |
| | | | | 701/470 |
| 2017/0041874 | A1* | 2/2017 | Jarosinski | H04M 1/72454 |
| 2018/0160268 | A1* | 6/2018 | De Vries | H04L 67/141 |
| 2019/0163529 | A1* | 5/2019 | Gao | G06F 9/5005 |
| 2019/0320383 | A1* | 10/2019 | Gardner | H04W 4/42 |
| 2020/0142047 | A1* | 5/2020 | Zwirn | G01S 13/003 |
| 2020/0225310 | A1* | 7/2020 | Eldic | G01S 5/019 |
| 2020/0413451 | A1* | 12/2020 | Taherzadeh Boroujeni | |
| | | | | H04W 48/10 |
| 2022/0053607 | A1* | 2/2022 | Rice | H04W 36/0069 |
| 2022/0369374 | A1* | 11/2022 | Taherzadeh Boroujeni | |
| | | | | H04W 48/10 |

OTHER PUBLICATIONS

3GPP, "Study on New Radio (NR) to Support Non Terrestrial Networks (Release 15)", 3GPP TR 38.811 V0.3.0, Dec. 2017, pp. 1-56.

Holma et al., "LTE for UMTS OFDMA and SC-FDMA Based Radio Access", John Wiley and Sons, 2009, pp. 25-27.

* cited by examiner

TELECOMMUNICATIONS APPARATUS AND METHODS

CROSS-REFERENCE TO RELATED APPLICATIONS

The present application is based on PCT filing PCT/EP2019/072142, filed Aug. 19, 2019, which claims priority to EP 18196379.4, filed Sep. 24, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

In view of this there is expected to be a desire for future wireless communications networks, for example those which may be referred to as 5G or new radio (NR) system/new radio access technology (RAT) systems, as well as future iterations/releases of existing systems, to efficiently support a wide range of devices associated with different operating characteristics in areas that may be difficult to service from conventional terrestrial networks, for example in the open sea.

One area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage cannot be provided by means of land-based antennas), such as isolated or remote areas, on board aircraft or ship) and/or may be used to provide enhanced service in areas that are also served by land-based network nodes. The expanded coverage that may be achieved by means of non-terrestrial networks may provide service continuity for machine-to-machine (M2M) or Internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment, such as NTN nodes and requirements for coverage enhancement give rise to new challenges for handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
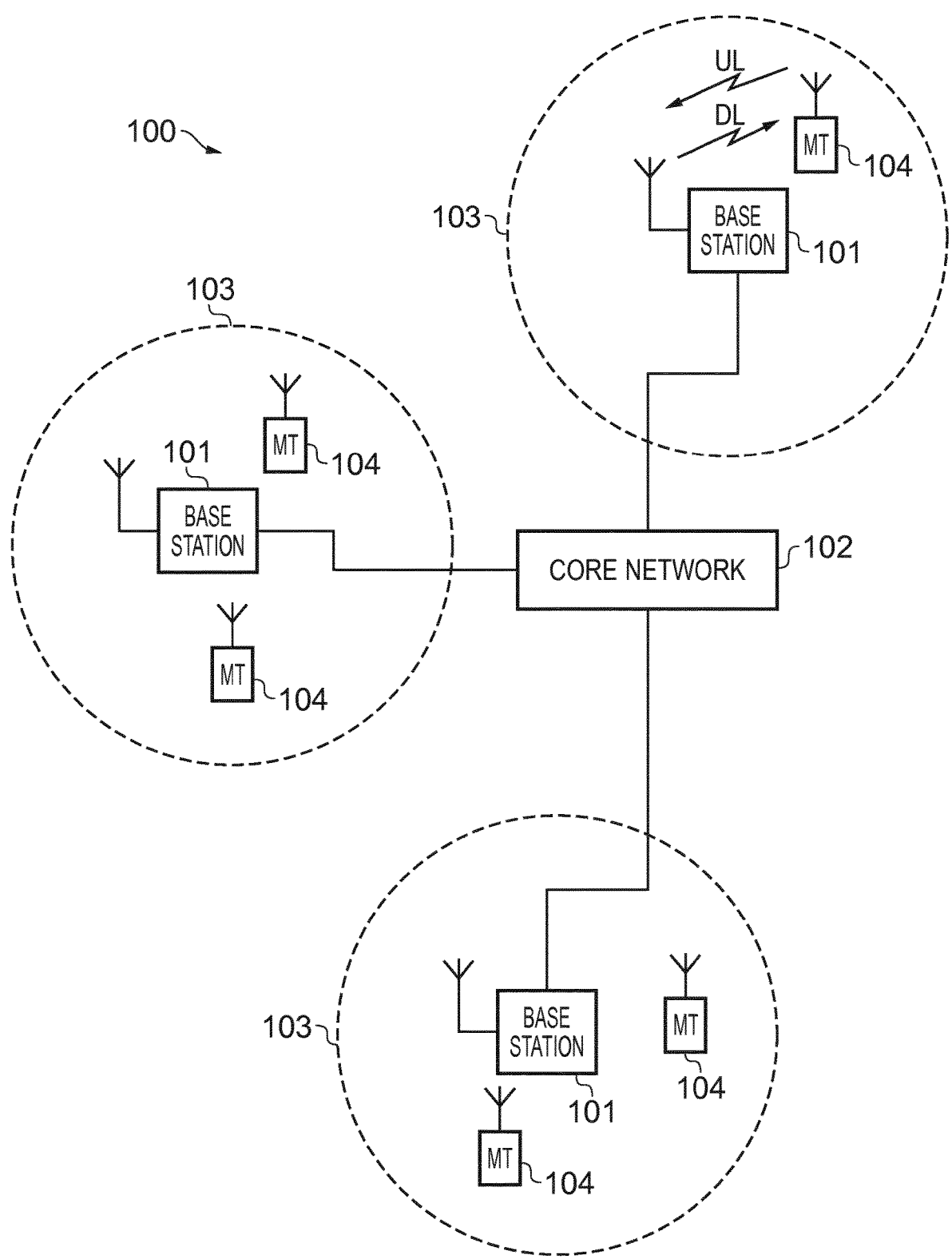
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body and associated proposals, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell/spot-beam) within which data can be communicated to and from terminal devices 104. In accordance with NTN proposals one or more base stations may be non-terrestrial, e.g. satellite based. In this regard it will be appreciated that satellite based means that the base station may be either physically on board of a non-terrestrial platform such as a satellite, or transmissions between the base station and the UEs transit through a non-terrestrial platform such as a satellite. Data is transmitted from base stations 101 to terminal devices 104 within their respective coverage areas 103 via a radio downlink. The coverage area may be referred to as a cell, and in the case of an NTN base station/radio access node, the coverage area may also be referred to as a spot-beam (a single NTN platform may support multiple spot-beams). Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth, and as noted above in an NTN network one or more base stations may be satellite based. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
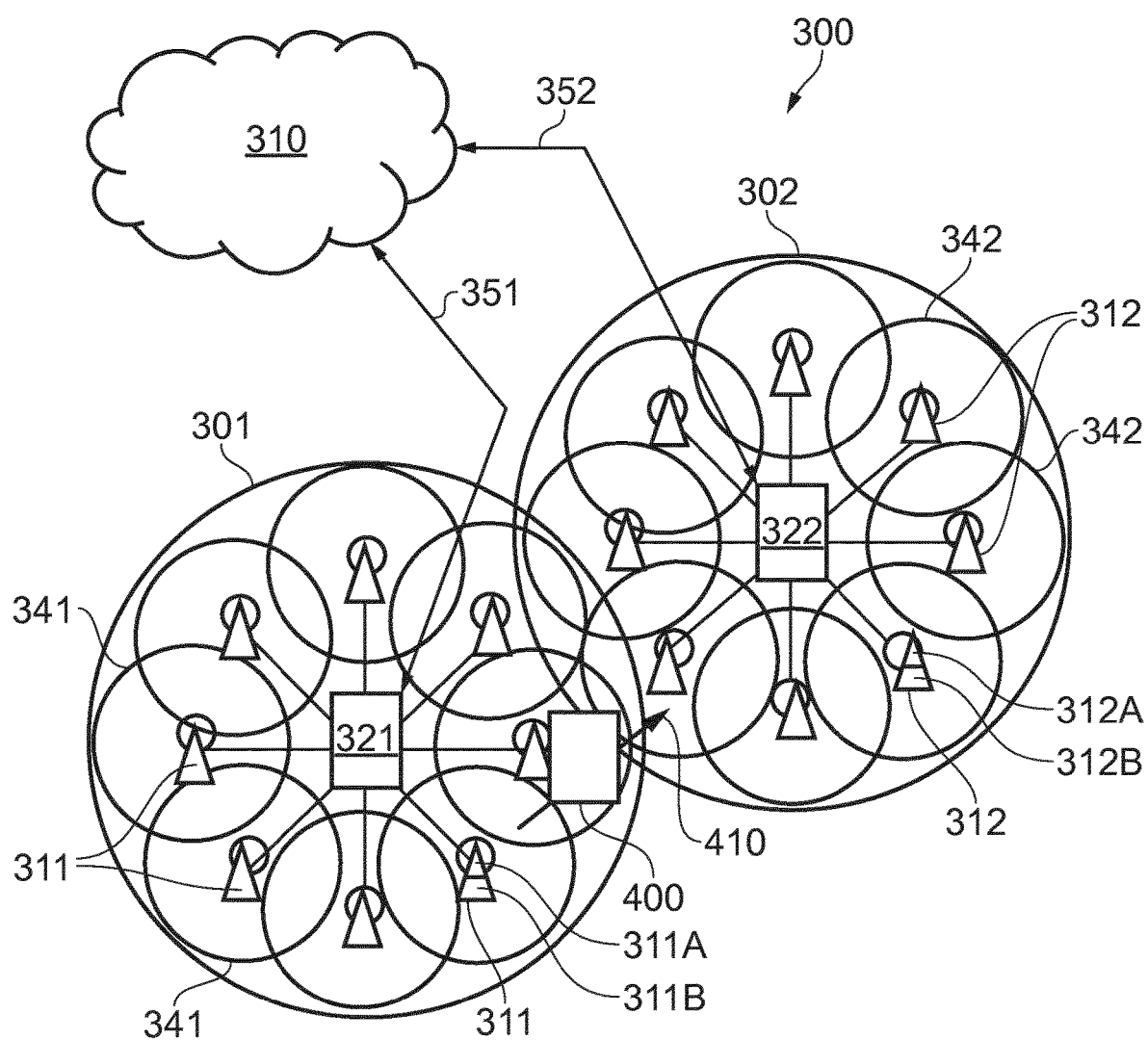
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein, and which may again include one or more NTN components providing radio access through a non-terrestrial node. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network, and as noted above some of these may be non-terrestrial in a network having an NTN part. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes, including NTN infrastructure equipment/access nodes, and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

Figure 3:
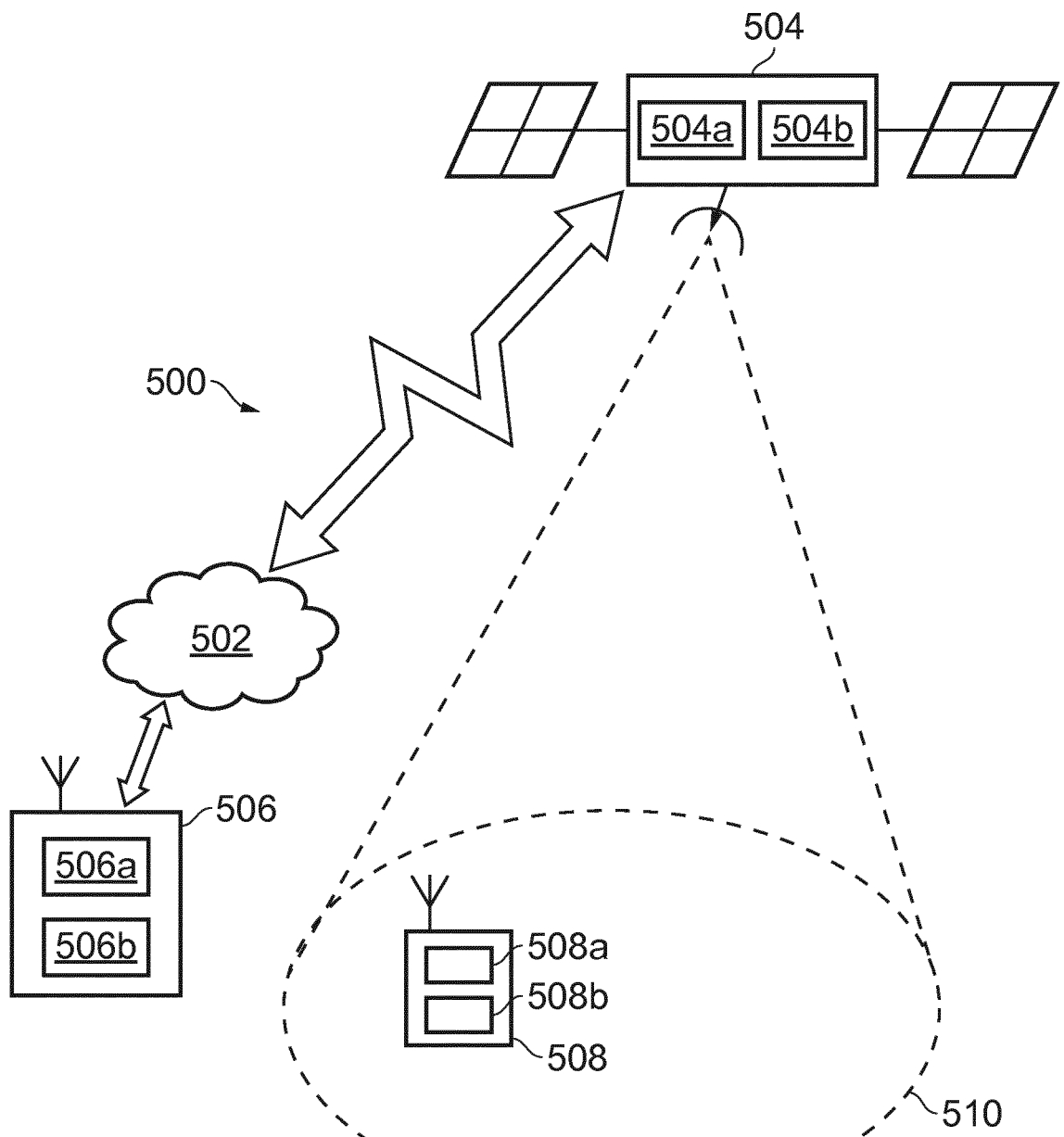
FIG. 3 schematically represents some aspects of a wireless telecommunication system in accordance with certain embodiments of the present disclosure.

FIG. 3 schematically shows some aspects of a telecommunications system 500 configured to support communications between a terminal device 508 and network access nodes 504, 506 in accordance with certain embodiments of the disclosure. One network access node is a terrestrial network access node 506 and one network access node is a non-terrestrial network access node 504, in this example an orbital satellite based terrestrial network access node. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access nodes 504, 506 may, for convenience, sometimes be referred to herein as base stations 504, 506, it being understood this term is used for simplicity and is not intended to imply any network access node should conform to any specific network architecture or should be terrestrial, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part 502 coupled to a radio network part. The radio network part comprises the radio network access nodes 504, 506 and the terminal device 508. It will of course be appreciated that in practice the radio network part may comprise a more than two network access nodes serving multiple terminal devices across various communication cells/spot-beams. However, only two network access nodes and one terminal device are shown in FIG. 3 in the interests of simplicity.

The terminal device 508 is arranged to communicate data to and from the network access nodes (base stations/transceiver stations) 504, 506 according to coverage. For the example shown in FIG. 3 it is assumed the terminal device 508 is currently within the coverage area/spot-beam 510 of the NTN radio access node 504. Typically the terminal device will be operable to connect to (i.e. be able to exchange user plane data with) one network infrastructure element at a time, and so as the terminal device moves around the network it may move in and out of coverage of the different network access nodes comprising the network. A particular issue with NTN radio access nodes is that the coverage area/spot-beam can itself move rapidly across the earth's surface so that a terminal device may move in and out of the coverage area of NTN radio access nodes relatively quickly, even when the terminal device itself may be stationary.

The network access nodes 504, 506, are communicatively connected to a core network part which is arranged to perform routing and management of mobile communications services to the terminal devices in the telecommunications system 500 via the network access nodes 504, 506. The connection from the NTN network access nodes 504 to the core network 502 is wireless while the connection from the terrestrial network access node 506 to the core network 502 may be wired or wireless. In order to maintain mobility management and connectivity, the core network part 502 also includes a mobility management entity, MME, 520 which manages the service connections with terminal devices operating in the communications system. As noted above, the operation of the various elements of the communications system 500 shown in FIG. 3 may be in accordance with known techniques apart from where modified to provide functionality in accordance with embodiments of the present disclosure as discussed herein.

The terminal device 508 is adapted to support operations in accordance with embodiments of the present disclosure when communicating with the network access nodes 504, 506. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The network access nodes 504, 506 each comprises transceiver circuitry 504a, 506a (which may also be referred to as a transceiver/transceiver unit) for transmission and reception of wireless signals and processor circuitry 504b, 506b (which may also be referred to as a processor/processor unit) configured to control the respective network access nodes 504, 506 to operate in accordance with embodiments of the present disclosure as described herein. Thus, the processor circuitry 504b, 506b for each network access node 504, 506 may comprise circuitry which is suitably configured/programmed to provide the desired functionality described herein using conventional programming/configuration techniques for equipment in wireless telecommunications systems. For each network access nodes 504, 506 the transceiver circuitry 504a, 506a and the processor circuitry 504b, 506b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated that each of the network access nodes 504, 506 will in general comprise various other elements associated with its operating functionality, such as a scheduler. For example, although not shown in FIG. 3 for simplicity, the processor circuitry 504b may comprise scheduling circuitry, that is to say the processor circuitry 504b may be configured/programmed to provide the scheduling function for the network access node.

Thus, some networks may include non-terrestrial network (NTN) parts which may either be fully integrated with a terrestrial network, as in the example of FIG. 3, or may operate as a stand-alone non-terrestrial-network.

The NTN network may be associated with a number of different platforms having different characteristics. Some proposals for NTN are indicated in the following table:

| Platform | Altitude range (km) | Orbit Shape | Beam footprint diameter (km) |
|---|---|---|---|
| Low-Earth Orbit (LEO) satellite | 300-1500 | Circular around Earth | 100-500 |
| Medium-Earth Orbit (MEO) satellite | 7000-25000 | | 100-500 |
| Geostationary Earth Orbit (GEO) satellite | 35786 | Notionally stationary at fixed position in terms of elevation/azimuth with respect to a given location on Earth | 200-1000 |
| UAS (unmanned aircraft system) platform (including HAPS—high altitude pseudo-satellite). May also be referred to as a Drone platform. | 8-50 (20 HAPS) | | 5-200 |
| High Elliptical Orbit (HEO) satellite | 400-50000 | Elliptical around Earth | 200-1000 |

In terms of mobility management, NTNs based on GEO-satellite and UAS/HAPS platforms are similar to terrestrial networks in that the cells (base stations) are notionally stationary and it is movement of terminal devices relative to the cells that gives rise to mobility within the network. This means mobility management procedures for such NTN network access nodes can, in essence, be implemented in the same manner as for terrestrial networks (potentially taking account of differences in signal propagation time as appropriate).

However for non-geostationary NTN platforms, e.g. LEO, MEO and HEO satellite platforms, the satellite (i.e. the base station/NTN radio access node) moves with respect to the earth, and so its coverage/spot-beam(s) also moves across the surface of the earth, typically relatively quickly. This means that whereas for a stationary cell (e.g. terrestrial base station or GEO satellite base station) the terminal device's movement relative to earth is what gives rise to mobility (ignoring changing radio channel conditions), for non-geostationary NTN platforms, terminal device mobility within the network is typically exceeded by the movement of the base station/satellite itself since the coverage footprint of non-geostationary NTN platforms will typically be moving across the earth significantly faster than terminal devices.

Due to the movement of non-geostationary based NTN platform spot-beam footprints across the earth, ubiquitous coverage may be provided by constellations of satellites. Thus for a given location of a terminal device on the earth surface, as one satellite moves along its orbit, the location may be illuminated by a spot-beam of the satellite for a time until that spot-beam footprint moves away from that location. Then the next spot-beam, possibly from the same satellite, takes over coverage (illumination) of the location until its illumination in turn drifts away from the location, and so on. Thus different spot-beams from different satellites provide coverage for a given location on the earth at different times.

The orbital paths of the satellites are known to the network and so at any one time, it is known which regions of the earth are covered by which satellite(s), and which spot-beam(s) from each satellite is currently illuminating/providing coverage for any particular location on the surface of the earth. The network can thus determine which spot-beam and satellite is currently covering a particular terminal device, and which spot-beam and satellite will be the next to cover the terminal device (i.e. to help manage mobility) if the network knows the location of the terminal device on the earth's surface. Therefore mobility management of NTN terminal devices (i.e. the process of handing them over from beam to beam/satellite to satellite) may rely on the network having knowledge of the location of the terminal device. Thus it may be expected for certain networks, in particular NTN networks, that a terminal device may be configured to report its location to the network, for example according to a repeating schedule or in response to a request from the network.

LEO satellites at the highest orbital altitude in the table above might have an orbital speed of around 7 km/s and a spot-beam coverage of around 500 km. This means the satellite may move a linear distance corresponding to the diameter of its spot-beam footprint in little more than a minute (around 70 seconds). This means even a stationary terminal device may need to be handed over from one spot-beam to the next every minute or so for LEO satellites at the highest orbital altitude, and potentially more often still for lower altitude LEO satellites which will move faster and typically have smaller diameter spot-beams. On this basis, the inventors have recognised that regular location reporting by a terminal device at a rate that is on the same order as the expected rate of handovers may place a significant signalling overhead requirement on the terminal device, resulting in utilisation of significant amounts of radio resources and power. Not only would the terminal device need to report its location relatively often it may need to connect to the network to do so, which can itself be a relatively long process with a relatively high signalling overhead.

This is because, as is well understood, wireless telecommunications networks may support different Radio Resource Control (RRC) modes for terminal devices, typically including: (i) RRC idle mode (RRC_IDLE); and (ii) RRC connected mode (RRC_CONNECTED). A terminal device typically transmits data whilst in RRC connected mode. The RRC idle mode, on the other hand, is used for terminal devices which are registered to the network (EMM-REGISTERED), but not currently in active communication (ECM-IDLE). Thus, generally speaking, in RRC connected mode a terminal device is connected to a radio network access node (e.g. base station, which may be a non-terrestrial radio access node in a NTN) in the sense of being able to exchange user plane data with the radio network access node. Conversely, in RRC idle mode a terminal device is not connected to a radio network access node in the sense of not being able to communicate user plane data using the radio network access node. The RRC connection setup procedure of going from RRC idle mode to RRC connected mode may be referred to as connecting to a cell/base station and entails the terminal device undertaking a RACH (random access channel) procedure, security activation procedure, RRC connection establishment procedure etc., which takes time to complete and consumes transmission resources in the network and power by the terminal device. In addition to these idle and connected modes there are also proposals for other RRC modes, such as the so-called RRC_INACTIVE mode. A terminal device in RRC_INACTIVE mode is one which is not in an active RRC connected mode with the radio access network (RAN), but is considered to be connected from a CN (core network) point of view, so that data can be sent without CN-level paging, but with paging performed instead at the RAN level, to cause/trigger the terminal device to resume RRC connection (e.g. enter an RRC connected mode) if necessary.

An advantage of the non-connected modes (RRC_IDLE and RRC_INACTIVE), is that they can be used to help a terminal device save power, but the terminal devices may not be able to take full advantage of this if it needs to transition to connected mode to transmit a location report too frequently.

As noted above, for a NGSO (non-geostationary orbit) platform in an NTN, the movement that dominates the need for mobility management is expected to be that of the satellite rather than the terminal devices. That is to say, it may be expected a terminal device is relatively stationary when compared to the movement of spot-beams/cells of the satellites providing the terminal device with coverage. For example, a proposal requirement for NR telecommunication systems is to support a terminal device speed of up to 500 km/h (around 0.14 km/s), which is significantly less than the orbital speed of LEO satellites which is typically more than 7 km/s.

With this in mind, and recognising the relatively large coverage areas of spot-beams in NTN, one approach in accordance with certain embodiments of the disclosure is to configure a terminal device to transmit a location report in response to the terminal device determining that it has moved by more than a pre-defined threshold distance since it last sent a location report. That is to say, rather than transmit location reports according to a regular timing schedule, the terminal device transmits location reports based on the extent to which it has moved since it last sent a location report. This can be expected to help the terminal device send fewer location reports than might otherwise be sent. From the perspective of the network, the network may assume the terminal device is somewhere within the threshold distance of its previously reported location until it receives a new location report from the terminal device. Mobility management for the terminal device by the network may thus be based on its most-recently reported location, even if that was reported some time ago. Thus, when a location report is received from a particular terminal device the network may in effect continue to assume the terminal device is at this location for the purposes of mobility management until an updated location report is received. When the network receives an updated location report for a terminal device the network may update the stored terminal device location to the new location and then uses this new location for mobility management until a further location report is received from the terminal device, and so on.

Figure 4:
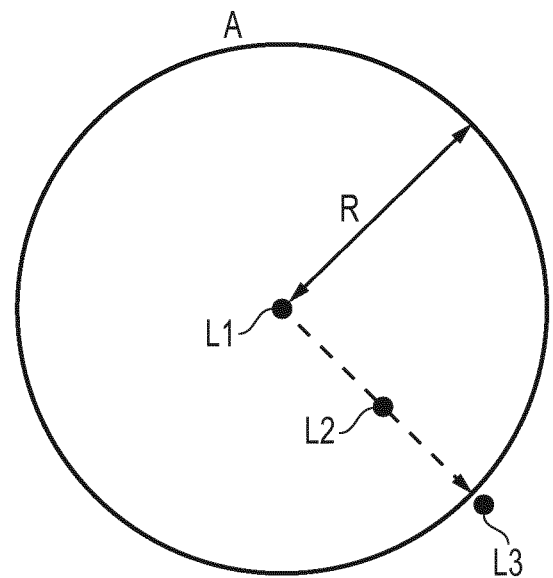
FIG. 4 schematically represents a terminal device moving from one location L1, to another location L2, and on to a further location, L3, in accordance with certain embodiments of the present disclosure.

An approach in accordance with certain embodiments of the disclosure is schematically represented in FIG. 4. In FIG. 4 it is assumed a terminal device's most recently reported location (position) is L1. The locus A is a circle of radius R whose centre is at the last reported location of the terminal device L1. The distance R (which may also be referred to as Dthresh) is a configured distance threshold from the location indicated in the most recent terminal device location report and represents a distance the terminal device will move from L1 before it is next triggered to send a location report to the network. Thus, the terminal device may be configured to regularly check its location, for example according to a schedule corresponding to existing proposals for location reporting, but to only actually send a location report if it has moved by more than the distance R since its most recent location report was sent. Thus, assuming the terminal device happens to be moving from location L1 to L3 via L2 as schematically represented in FIG. 4, (for example because this is the path of an aeroplane on which the terminal device is operating), when the terminal device determines its position is at L2 it does not send a location report (because the distance from L1 to L2 is less than R), but when the terminal device determines its position is at L3 it does then send a location report (because the distance from L1 to L3 is more than R.

Assuming an example value for R of 10 km, for a terminal device moving in a consistent direction with a ground speed of 500 km/h (=0.139 km/s) then a location report would be sent every (10 km/0.139 km/s), which is around 72 s. However, for a more typical vehicular terminal device ground speed of perhaps 120 km/h (=0.033 km/s) and the same value of R, then a location report would be necessary only every (10 km/h/0.033 km/s), which is around 300 s (5 minutes). Thus location reports may be sent less frequently for slower moving terminal devices.

In terms of a suitable value for R (Dthresh), for LEO constellations, adjacent spot-beam footprints overlap on the surface, both for intra-satellite spot-beams (neighbouring spot-beams from the same satellite) and inter-satellite spot-beams (neighbouring spot-beams from different satellites). The region of overlap may be expected to be typically tens of km or so across at its widest. In accordance with certain embodiments of the disclosure a value for R may be selected having regard to the extent to which neighbouring spot-beams/coverage areas overlap. For example, if a characteristic width of overlaps between neighbouring spot-beams is W, R may be chosen to be less than W, but more than 0.1 W, for example on the order of ⅓ W or ½ W. This will provide for on the order of two or three location reports (position updates) as a terminal device traverses the region of overlap.

In some examples a terminal device may be configured with different values of R (Dthresh) depending on how closely it is located to the edge of its currently serving spot-beam. For example, when the terminal device sends a location report, the network may respond by configuring the terminal device with a new value of R according to its reported position. For example, when the terminal device reports a position that indicates it is getting nearer to the edge of the footprint of its serving spot-beam it may be configured with a smaller value of R than when it is nearer the centre of its spot-beam (this may, for example, be in response to a reconfiguration message received by the terminal device from the network after sending the location report or based on the terminal device determining that a pre-defined trigger condition for changing the value of R is met, e.g. a trigger condition established in a previous configuration message from the network). The network may also reconfigure the terminal device with a smaller value of R if it is determined the terminal device is getting nearer to the edge of the footprint of its serving spot-beam due to movement of the spot-beam regardless of whether the terminal device itself has transmitted a new location report. In some example a default value for R may be set by an operating standard for the wireless telecommunications system or broadcast in system information signalling, and dedicated signalling, for example RRC signalling, may be used to change this to another value for an individual terminal device.

Thus, in accordance with the principles discussed above a terminal device operating in a wireless telecommunication system may be configured to determine its location, for example in accordance with a predefined repeating schedule, but to only transmit a location report in respect of a determination of its location if it is determined its location has moved by at least a predefined threshold distance since it last transmitted a location report. This can help reduce the signalling and power used by the terminal device for the network to maintain a record of the current location of the terminal device for mobility management. The magnitude of the predefined threshold distance may be selected having regard to the desired accuracy with which the location of the terminal device is known, and in general but may depend on the arrangement of coverage areas provided in the network, example the extent to which neighbouring coverage areas overlap.

In addition to transmitting location reports less frequently than would be needed with the currently proposed approaches, the inventors have recognised further savings in terms of signalling and power may be achieved if a terminal device that is not radio resource control connected to the network is configured to transmit its location reports without transitioning to an RRC connected mode. Thus, in accordance with certain embodiments of the disclosure, if a terminal device that does not have an active RRC connection to the network determines it should send a location report (because it has moved by more than its currently configured threshold distance since it last sent a location report), instead of transitioning to a radio resource control connected mode to transmit the location report, the terminal device may instead use a configured grant approach to update its position to the network. In accordance with certain embodiments of this approach, the location report signalling transmitted by the terminal device may comprise a predefined preamble sequence and be transmitted using radio resources that have been previously configured for this purpose. This preamble may include or precede further signalling containing information that identifies the terminal device to the network and/or provide indication of the terminal device's location. Because this approach can help obviate a need for initial acquisition of the network followed by a RACH procedure to establish an RRC connection it can help in reducing the time, amount of signalling, and power needed for the terminal device to transmit a location report.

In some respects, approaches for transmitting signalling comprising a location report without transitioning to a radio resource control connected mode may mirror aspects of a random access channel procedure, or example of the kind used when a terminal device wishes to initiate a transition to a radio resource control connected mode.

Thus, in some embodiments a three-step RACH (or RACH-like) approach can be adopted to convey the location report. For example, in signalling broadly mirroring Msg1 of a conventional RACH procedure, a preamble and/or specific RACH time-frequency radio resources may be used for a transmission by the terminal device to indicate the signalling is for a location report from the terminal device. The preamble sequence may, for example, be predefined for indicating the signalling is associated with a location report. On receiving this Msg1-like signalling, the network may respond with signalling indicating an allocation of radio resources in signalling broadly mirroring Msg2 of a conventional RACH procedure to allocate an uplink-grant of radio resources for the terminal device to use to send the location information for the location report. After receiving the uplink-grant, the terminal device may send the information comprising the location report in signalling on the allocated uplink resources that broadly mirrors Msg3 signalling in a conventional RACH procedure that supports early uplink of data (i.e. that the transmission of higher layer data during RACH). The information comprising the location report will depend on implementation and may, for example, comprise (in this or any other embodiment) an indication of the location of the terminal device in terms of absolute coordinates in a suitable coordinate system (for example latitude and longitude or a Cartesian grid defined relative to the earth) or relative to last reported location (for example an indication of a direction in which the terminal device has moved with the network being configured to seeing the amount it has moved corresponds with the predefined threshold distance for triggering a location report). The location information may also include other information that may be appropriate according to the implementation at hand, example a current heading and/or speed for the terminal device. Thus in accordance with this procedure the terminal device can report its location without entering into an RRC_CONNECTED state.

In some examples of this approach, a plurality of terminal devices (potentially all terminal devices) may use a common preamble (or set of preambles) and/or specific RACH time and frequency resources (or set of RACH time and frequency resources) which are reserved for location reporting purposes. The common preamble (or set of preambles) and/or specific RACH time and frequency resources (or set of RACH time and frequency resources) may be defined in an operating standard for the wireless telecommunications system, or broadcast in system information, for example. With this approach of shared preambles/resources for location reporting, a terminal device transmitting a location report may send an identifier for itself in the signalling corresponding to Msg3 of a RACH procedure. The identifier may, for example, be a network-allocated radio network temporary identifier or an identifier permanently associated with the terminal device, for example an IMSI or IMEI or part thereof. In other examples, an individual terminal device may be associated with a specific preamble (or set of preambles) and/or specific RACH time and frequency resources (or set of RACH time and frequency resources) to use for location reporting so that the network can identify the terminal device based on the preamble and/or radio transmission resources used. With this approach the terminal device may be provided with an indication of its dedicated the preamble(s) and/or radio transmission resources in prior radio resource control, RRC, signalling, for example in a previous RRC connection release and/or RRC connection inactivation message.

In some examples, after the terminal device has transmitted the indication of the relevant location report to the network, for example in a step corresponding to Msg3 of a RACH procedure and this has been received by the network, the network may transmit to the terminal device signalling, Msg4, to acknowledge reception of the transmitted location report. The network may also use MSG 4 to inform the terminal device to remain in RRC_IDLE/INACTIVE mode, or if it is deemed necessary to proceed to establish an RRC connection. The network may also provide a new value for R (i.e. the predefined distance threshold for triggering location reporting) for the terminal device in association with Msg4. For example, if the terminal device is deemed to be close to the spot-beam footprint boundary and it may be desirable to trigger more frequent location reports so the new value of R may be set lower than the existing value.

In the above examples it is assumed RRC protocol and messages between the terminal device and base station may be used for enhanced approaches for location reporting as described herein. However, the LPP (LTE positioning protocol) between a terminal device and SMLC (Serving Mobile Location Center), which is also based on RRC protocol principles and has similar message encoding rules as RRC, could be used, for example where the base station is not involved in determining the terminal device position. So, a terminal device in RRC_INACTIVE state may be asked to report its updated location to SMLC when the R (Dthresh) criteria is satisfied, using LPP protocol messages. The same may apply to a terminal device in RRC_Connected mode as well where the terminal device reports its location once the R criteria has been satisfied.

In order to achieve this, terminal device may send an indication to the base station that the random access preamble or Msg3 is meant for the SMLC so that the base station is able to send this information to the SMLC. The SMLC may then send its response to the base station which may be carried in RAR (Msg2) or Msg4 as in the examples above.

In some example a MAC CE (control element) may be adopted to send a location report.

In approaches according to some example implementations the terminal device may be configured to transmit location information indicating a difference between its current position and its most recent previously reported position rather than transmitting an indication of its absolute position. This can help reduce the amount of data to be included in the location report signalling and also allow secure communication by not disclosing the absolute location in unprotected messages or messages protected with the old security keys. For example, referring to the example scenario discussed above with reference to FIG. 4, the terminal device transmits an initial location report indicating L1 and then moves, via L2, to L3 where the terminal device determines it has moved by more than the predefined threshold distance R and transmits a location report indicating the new location L3. In accordance with certain embodiments of the disclosure, the information transmitted in the location report signalling at L3 may simply comprise an indication of the direction from L1 to L3. When the network receives this location report it is able to determine the location L3 based on the known previously reported position L1 and the direction the terminal device has moved as indicated in the location report signalling from L3 by assuming the terminal device has moved a distance corresponding to the predefined threshold distance R.

Figure 5:
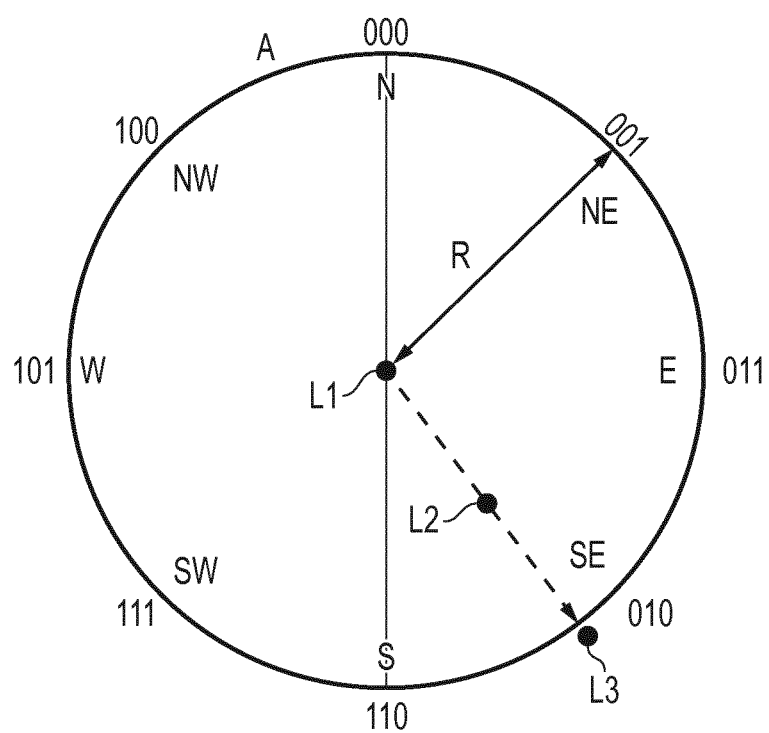
FIG. 5 schematically represents a terminal device moving from one location L1, to another location L2 in accordance with certain embodiments of the present disclosure.

The direction in which the terminal device has moved may be indicated in the location report signalling by indicating the closest one of a predefined number of directions. For example the predefined directions may correspond with North, North-East, East, South-East, South, South-West, West and North-West as schematically indicated in FIG. 5. FIG. 5 is similar to, and will be understood from, FIG. 4, but further shows these eight predefined directions. In this example the location L3 is proximity South-East of location L1. Therefore, the location signalling transmitted by the terminal device at L3 may simply indicate this is the direction along which the terminal device has moved away from the previously-reported location L1. In this example in which there are eight predefined directions, the location signalling requires only three bits of information, with each direction associated with different values for these three bits of information as schematically indicated around the locus A represented in FIG. 5. In this example the different directions are Gray coded (i.e. so that adjacent directions only differ in one bit), but it will be appreciated that other mappings may be used. In one example approach the location signalling may comprise a preamble sequence selected from a plurality of potential preamble sequences respectively corresponding to different ones of the eight predefined directions. In this case the different preamble sequences may be independent, or may comprise a single sequence with different cyclic shifts. For example, the preamble sequence may comprise 32 bits and may be transmitted without any shift to indicate North, with a shift of four bits to indicate North-East, a shift of 8-bit to indicate East, and so on through to a shift of 28 bits (−4 bits) to indicate North-West.

In some example implementations a common set of predefined preambles may be defined for all terminal devices to use to indicate their direction of movement from their last reported position. In this case another indication may be used to identify the terminal device transmitting the report. For example, in one implementation a preamble sequence may comprise two parts, with a second part indicating the direction a terminal device has moved, whilst the first part indicates the identity of the terminal device (or vice versa). In another example, a dedicated set of predefined preambles (which may be unrelated to each other or different cyclic shifts of a single preamble sequence) may be associated with each terminal device so the transmitted preamble indicates both the direction of movement from the previously reported location and the identity of the terminal device.

The granularity of the angular information (i.e. the number of different predefined directions that can be indicated in the location signalling) may take into account the characteristic extent of overlap of neighbouring spot-beams. An example is characterised by the distance between points where the edges of two neighbouring spot-beams intersect, as schematically indicated in FIG. 6.

Figure 6:
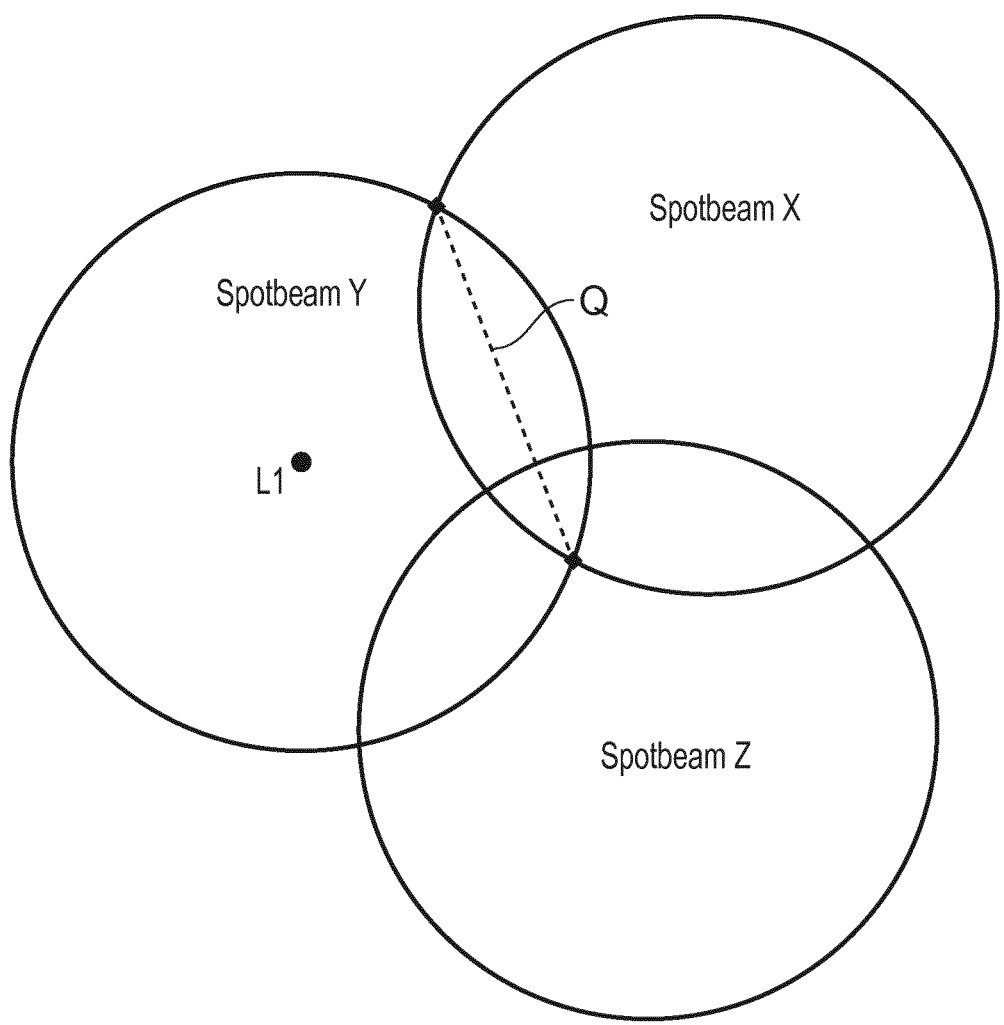
FIG. 6 schematically represents an extent of overlap of coverage areas associated with different spot-beams in non-terrestrial network in accordance with certain embodiments of the present disclosure.

FIG. 6 schematically represents an arrangement of three example spot-beams on the surface of the Earth, indicated a spot-beam X, spot-beam Y and spot-beam Z. The length of the dashed line marked Q is an indication of the extent to which spot-beams X and Y overlap. It will be appreciated this is merely one example way of characterising the extent of overlap, and other ways may include, for example, the area of the region of overlap, either in absolute terms or as a fraction of the respective areas of the spot-beams, or the width of the region of overlap in a direction perpendicular to the dashed line shown in FIG. 6. The desired granularity of the location reports around the locus A may be determined as illustrated by the lines radiating from the centre (location L1) to the locus A in FIG. 6.

If the terminal device is currently in spot-beam Y of FIG. 6 and moving towards the area of overlap of spot-beams Y and X, it can be expected that at some point, the terminal device will cross the dashed line Q. As the terminal device approaches the boundary of spot beam Y, it may be useful for the network to discern from its location reports whether it is moving towards spot beam X or spot beam Z. One example suitable granularity of the angular location reporting can be derived from the angle subtended to the centre (L1) of the current threshold (R) locus (A) by an appropriate fraction of the length of Q. For example, in the case illustrated in FIG. 6, it may be considered appropriate to discern two or three terminal device positions along the dotted line close to each locus A in order for the network to be able to predict whether the terminal device will move into spot-beam X or spot-beam Z. For a given satellite ephemeris, the network knows the length Q and so can configure the angular granularity of the angular information to be reported. If this works out to be N different angles, then only log 2(N) bits need to be transmitted for each location report. This is illustrated in FIG. 5 for the case where N=8.

Figure 7:
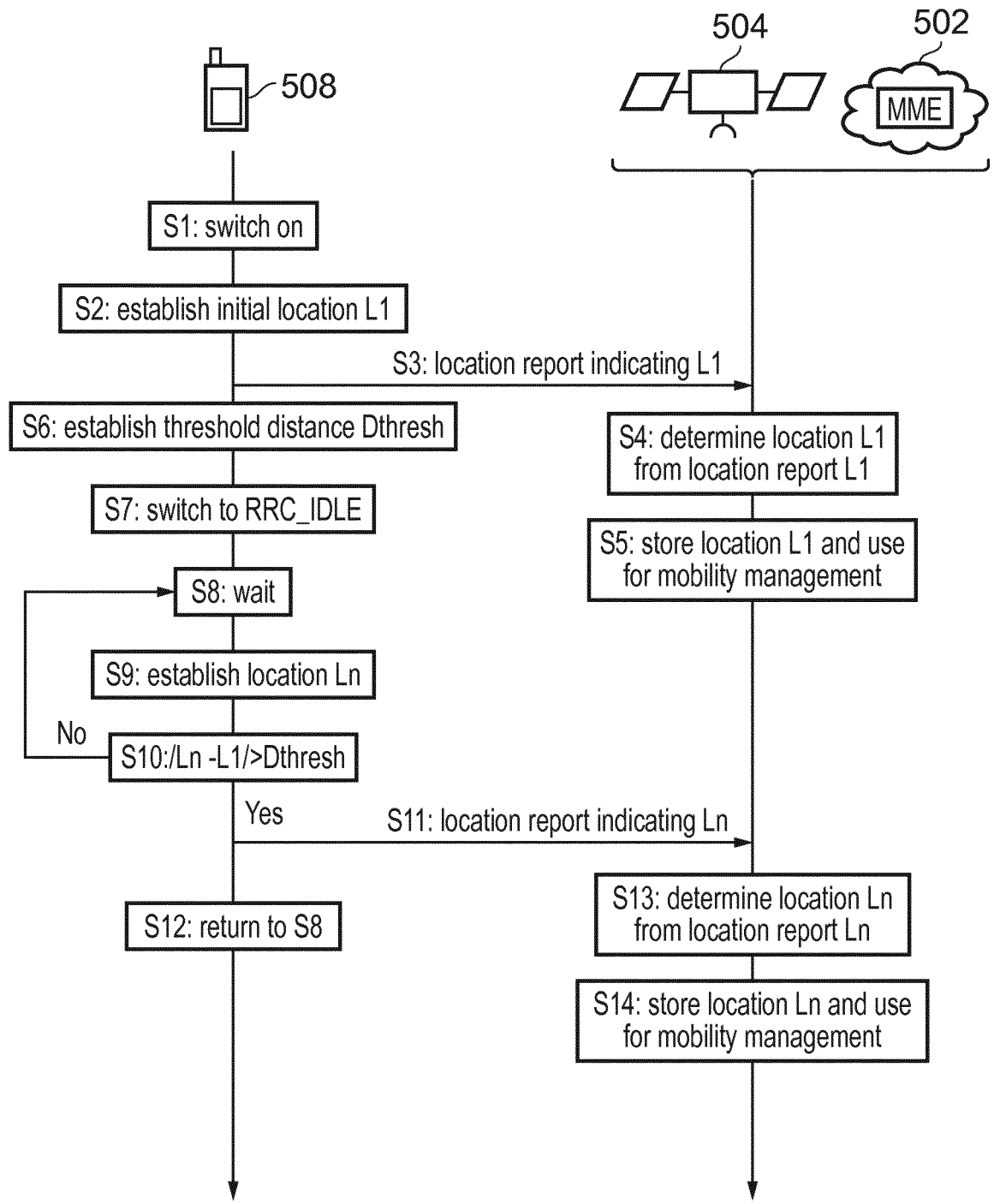
FIG. 7 is a signalling ladder diagram (message sequence chart) schematically representing some operating aspects of wireless telecommunications systems in accordance with certain embodiments of the disclosure.

Thus, FIG. 7 is a ladder diagram schematically representing some operating aspects of the wireless telecommunications system 500 discussed above with reference to FIG. 3 in accordance with certain embodiments of the disclosure. In particular, the diagram represents some operations and signalling exchange associated with the terminal device 508 and network infrastructure equipment comprising the non-terrestrial radio network access node (base station) 504 and the core network in accordance with certain embodiments of the disclosure.

The processing represented in FIG. 7 starts in step S1 in which the terminal device 508 is initially switched on and establishes an initial connection to the network. In this example it is assumed the terminal device 508 is within the coverage area provided by the non-terrestrial radio network access node 504, as schematically represented in FIG. 3. Step S1 may be performed in accordance with conventional techniques.

In step S2 the terminal device establishes its initial location L1. The initial location for the terminal device may be established in accordance with conventional techniques (including security activation). For example, the terminal device may comprise a global navigation satellite system receiver, for example a GPS receiver, and may use this to determine its initial location L1.

In step S3 the terminal device transmits a location report indicating its initial location L1 to the network infrastructure equipment. In this example, it is assumed for the initial location report, the terminal device transmits its absolute position on the earth, for example in terms of latitude and longitude, or suitable alternate coordinate system.

In step S4, the network infrastructure equipment, having received the location report transmitted in step S3, determines the initial location L1 of the terminal device from the location report received in step S3.

In step S5, the network infrastructure equipment stores the location determined in step S4 and uses this for mobility management. In this regard, the actual use of the information for mobility management may be performed in accordance with and proposed techniques for wireless telecommunications networks including an NTN part. That is to say, what is of primary significance in accordance with certain embodiments of the disclosure is not how the wireless telecommunications network uses the location information for the terminal device for mobility management, but how the location information for the terminal device is provided to the network infrastructure equipment.

It will be appreciated different components of the network infrastructure equipment may perform different aspects of the processing associated with steps S4 and S5. For example, it can be expected for the example wireless telecommunications architecture represented in FIG. 3 that the non-terrestrial network access node 504 is responsible for receiving the signalling transmitted by the terminal device while the storage of the determined initial location L1 and its use for mobility management may be performed by the MME (mobility management entity) in the core network 502 or SMLC (not shown). The process of determining the initial location L1 from the information received in the location report in step S3 may be performed in either or both the non-terrestrial network access node 504 or the core network 502 according to the implementation at hand.

In step S6 the terminal device establishes a predefined threshold distance Dthresh for triggering location reporting. The predefined threshold distance Dthresh may be predefined in accordance with an operating standard of the wireless telecommunications system or may be selected within the wireless telecommunications system having regard to the extent of regions of overlap between neighbouring spot-beams/cell coverage areas as noted above. In a typical example, the predefined threshold distance Dthresh may, for example, be a distance in the range 1 km to 25 kilometres, for example between 5 km and 15 km, for example between 8 km and 12 km, and in this example is assumed to be 10 km.

In step S7, having completed the initial attached procedure and established the relevant configuration information for location reporting, the terminal device transitions to RRC_IDLE mode if there is no data to transmit or receive.

In step S8 the terminal device waits for a period of time. As discussed above, in accordance with certain embodiments of the disclosure, the terminal device is configured to iteratively establish its location to determine whether it has moved sufficiently far from its previously reported location that it should transmit a location report indicating this to the network. The duration of the period of waiting in step S8 is selected according to the desired rate at which the terminal device checks to determine whether it should transmits a location report. For example, the wait time may be configured having regard to the likely rate at which the terminal device moves between coverage areas associated with different spot-beams/cells in the wireless telecommunications system. In this example it is assumed a spot-beam from the non-terrestrial network access node 504 would part a given location within around 70 seconds. Thus, the wait time may be configured to be around 12 seconds such that the terminal device checks its location around six times during the passage of the spot-beam. It will be appreciated the reference here to the terminal device waiting is only in respect of the location reporting procedure, it does not mean the terminal device is not functioning normally in respect of its other operations, for example in respect of monitoring for paging signalling and so forth.

In step S9 the terminal device establishes its current location Ln. As for step S2, this may be performed in accordance with any conventional technique, for example using a GNSS receiver, or other positioning technology.

In step S10 the terminal device determines whether or not the distance between its current location Ln and the previously-reported location L1 is greater than the predefined threshold distance established in step S6 (i.e. Ls|Ln−L1|≥Dthresh).

If in step S10 the terminal device determines the distance between its current location Ln and the previously-reported location L1 is not equal or greater than the predefined threshold distance Dthresh, the processing follows the branch marked "No" back to step S8, as indicated in FIG. 7, where the processing for the terminal device continues as discussed above.

If, however, in step S10 the terminal device determines the distance between its current location Ln and the previously-reported location L1 is greater than the predefined threshold distance Dthresh, the processing follows the branch marked "Yes" to step S11.

In step S11 the terminal device sends a location report to the network infrastructure equipment indicating its current location Ln. As discussed above, in accordance with some embodiments of the disclosure the location report transmitted in step S11 may be transmitted while the terminal device is still in a non-radio resource control connected mode, and furthermore may comprise an indication of the absolute current location for the terminal device (as example in terms of latitude or longitude) or may simply indicate the current location for the terminal device relative to its previously-reported location. In this regard, the network infrastructure equipment may be configured to assume the magnitude of the distance between the current terminal device location and the previously-reported location corresponds to the predefined threshold distance so that the location report transmitted in step S11 might only indicate the direction in which the terminal device has moved from its previously reported location L1 to its current location Ln.

Having transmitted the signalling indicating its current location in step S11, the terminal device, and as schematically indicated in step S12, the processing for the terminal device returns back to step S8 where the processing continues as discussed above.

In step S13 the network infrastructure equipment determines the absolute location Ln of the terminal device from the information contained in the location report received in step S11. The manner in which the absolute location Ln for the terminal device is determined will depend on the nature of the information contained in the location report received in step S11. For example, if the location report indicates the absolute position of the terminal device, the network infrastructure equipment can established this directly, and if the location report indicates the position of the terminal device relative to its previously reported location, the network infrastructure equipment can establish the absolute location by combining the previously-reported location with the indicated relative location.

In step S14, the network infrastructure equipment stores the new location for the terminal device determined in step S13 and uses this for mobility management. In this regard, the actual use of the information for mobility management may be performed in accordance with any proposed techniques for wireless telecommunications networks including an NTN part. That is to say, what is of primary significance in accordance with certain embodiments of the disclosure is not how the wireless telecommunications network uses the location information for the terminal device for mobility management, but how the location information for the terminal device is provided to the network infrastructure equipment.

As noted above for steps S4 and S5, it will be appreciated that different components of the network infrastructure equipment may perform different aspects of the processing associated with steps S13 and S14. For example, it can be expected for the example wireless telecommunications architecture represented in FIG. 3 that the non-terrestrial network access node 504 is responsible for receiving the signalling transmitted by the terminal device while the storage of the determined updated location Ln and its use for mobility management may be performed by the MME in the core network 502. The process of determining the location Ln from the information received in the location report in step S11 may be performed in either or both the non-terrestrial network access node 504 or the core network 502 according to the implementation at hand.

Thus, the processing discussed above and represented in FIG. 7 provides a scheme whereby network infrastructure equipment may be kept informed of a terminal device's location to facilitate mobility management, but without requiring the terminal device to frequently transmit location reports which may not be needed in the sense of there not needing to be any change to the mobility management handling for the terminal device because it has not moved far enough from the location currently stored in the network for the terminal device. As discussed above, this can help reduce the amount of location reporting required, thereby helping reduce the amount of signalling overhead and terminal device power needed to support mobility management.

Figure 8:
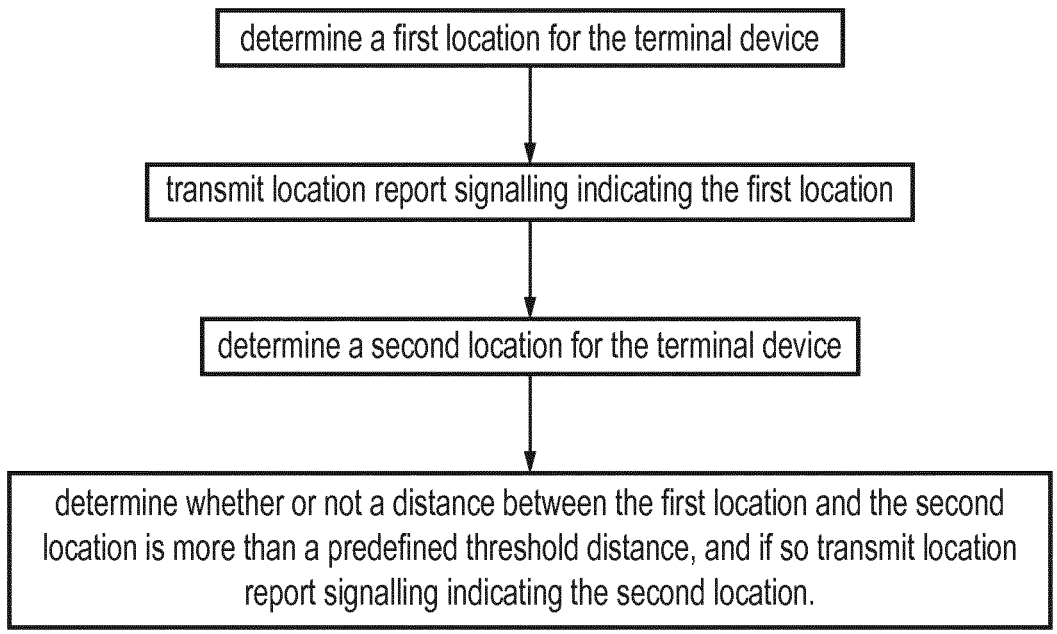
FIG. 8 is a flow chart schematically representing some operating aspects of a terminal device (UE) in accordance with certain embodiments of the disclosure.

FIG. 8 is a flow diagram schematically representing a method of operating a terminal device in a wireless telecommunications system comprising the terminal device and a non-terrestrial network access node in accordance with the principles discussed herein. In a first step of the process represented in FIG. 8, the terminal device determines a first location for the terminal device. In a second step of the process represented in FIG. 8, the terminal device transmits location report signalling indicating the first location. In a third step of the process represented in FIG. 8, the terminal device determines a second location for the terminal device. In a fourth step of the process represented in FIG. 8, the terminal device determines whether or not a distance between the first location and the second location is more than a predefined threshold distance, and if so transmits location report signalling indicating the second location.

As discussed herein, in some examples the location report signalling indicating the second location may comprise an indication of a difference between the first location and the second location.

The location report signalling indicating the second location may simply comprise an indication of a direction from the first location to the second location.

The predefined threshold distance may be established by the terminal device from one or more of: (i) configuration information received in system information broadcast, SIB, signalling; (ii) configuration information received in radio resource control, RRC, signalling or long term evolution positioning protocol, LPP, signalling (ii) an operating standard for the terminal device.

The predefined threshold distance may be in a range selected from the group comprising: between 1 km and 25 km; between 5 km and 15 km; and between 8 km and 12 km.

The location report signalling indicating the second and subsequent locations may be transmitted when the terminal device is not in a radio resource control, RRC, connected mode.

The location report signalling indicating the second location may comprise a preamble sequence selected from a plurality of predefined potential preamble sequences, wherein the preamble sequence is selected based on the second location.

Respective ones of the plurality of predefined potential preamble sequences may be associated with different directions, and the preamble sequence transmitted in a location report may be selected based on a correspondence between the direction from the first location to the second location and the different directions associated with the plurality of predefined potential preamble sequences.

The number of the plurality of predefined potential preamble sequences may be selected in the network according to the characteristic extent of overlap of neighbouring communication cells in the network.

Respective ones of the plurality of predefined potential preamble sequences may correspond with different cyclic shifts of a single preamble sequence.

The location report signalling indicating the second location may be transmitted using radio resources which are predefined for location reporting.

The location report signalling indicating the second and subsequent locations may comprise a first message transmitted by the terminal device comprising a preamble sequence and a subsequent message transmitted by the terminal device indicating the second location, wherein the subsequent message transmitted by the terminal device is transmitted on radio resources indicated in a radio resource allocation message received by the terminal device in response to transmitting the first message.

The preamble sequence comprises an indication of an identifier for the terminal device.

The terminal device may receive acknowledgement signalling from the network indicating the location report signalling indicating the second location has been received.

The terminal device may receive signalling indicating a change to the predefined threshold distance to be used for future location reporting in response to transmitting the location report signalling indicating the second or subsequent locations.

Figure 9:
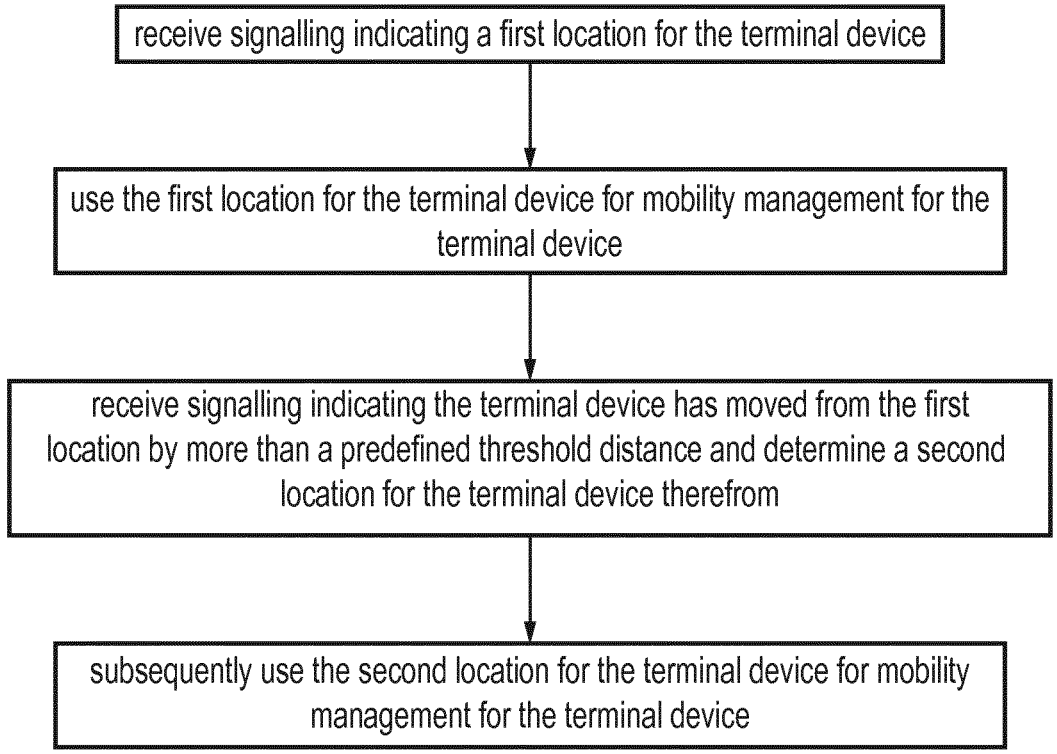
FIG. 9 is a flow chart schematically representing some operating aspects of network infrastructure equipment in accordance with certain embodiments of the disclosure.

FIG. 9 is a flow diagram schematically representing a method of operating network infrastructure equipment comprising a non-terrestrial network access node in a wireless telecommunications system comprising the network infrastructure equipment and a terminal device. In a first step of the process represented in FIG. 9, the network infrastructure equipment receives signalling indicating a first location for the terminal device. In a second step of the process represented in FIG. 9, the network infrastructure equipment uses the first location for the terminal device for mobility management for the terminal device. In a third step of the process represented in FIG. 9, the network infrastructure equipment receives signalling indicating the terminal device has moved from the first location by equal to or more than a predefined threshold distance and determines a second location for the terminal device therefrom. In a fourth step of the process represented in FIG. 9, the network infrastructure equipment subsequently uses the second location for the terminal device for mobility management for the terminal device.

The location report signalling indicating the terminal device has moved from the first location by more than a predefined threshold distance may be received when the terminal device is not in a radio resource control, RRC, connected mode.

The location report signalling indicating the terminal device has moved from the first location by equal to or more than a predefined threshold distance may comprise a preamble sequence selected from a plurality of predefined potential preamble sequences.

Respective ones of the plurality of predefined potential preamble sequences are associated with different directions, and wherein a direction from the first location to the second location is determined according to which of the plurality of predefined potential preamble sequences is received.

The number of the plurality of predefined potential preamble sequences are selected in the network according to the characteristic extent of overlap of neighbouring communication cells in the network.

Thus there has been described a method of operating a terminal device (and corresponding terminal device and circuitry for a terminal device) in a wireless telecommunications system comprising the terminal device and a non-terrestrial network access node, wherein the method comprises the terminal device performing the steps of: determining a first location for the terminal device transmitting signalling indicating the first location; determining a second location for the terminal device; determining whether or not a distance between the first location and the second location is equal to or more than a predefined threshold distance, and if so transmitting signalling indicating the second location.

There has also been described a method of operating network infrastructure equipment (and corresponding network infrastructure equipment and circuitry for network infrastructure equipment) comprising a non-terrestrial network access node in a wireless telecommunications system comprising the network infrastructure equipment and a terminal device, wherein the method comprises the network infrastructure equipment performing the steps of: receiving signalling indicating a first location for the terminal device; using the first location for the terminal device for mobility management for the terminal device; receiving signalling indicating the terminal device has moved from the first location by more than a predefined threshold distance and determining a second location for the terminal device therefrom; and subsequently using the second location for the terminal device for mobility management for the terminal device and until the next location report, using this second location as the new first location.

Thus, to summarise some aspects of certain embodiments of the disclosure, for location reporting for mobility management in NTN, network infrastructure equipment may store the last reported/determined location of a terminal device and the terminal device will only transmit a location report when the terminal device has moved beyond a configured distance from the last reported location currently stored by the infrastructure equipment. The configured distance may be determined in accordance with the characteristic width of the areas of spot-beam footprint overlap in the communication system.

In accordance with some example implementations a location report triggered by the terminal device moving beyond the configured distance from its previously-reported location may not comprise absolute coordinates of the new location relative to the earth but may comprise relative coordinates of the new location relative to the previously-reported location, i.e. what may be referred to as a delta-location. The infrastructure equipment on receiving the location report indicating the delta-location may thus apply the delta-location to the currently-stored coordinates for the terminal device to determine the new absolute location coordinates for the terminal device. In this case an initial absolute location for the terminal device may be reported to the network when the terminal device first connects to the network. The terminal device may also be configured to provide the network with an indication of its absolute coordinates, rather than just a delta-location, if a predefined amount of time or predefined number of delta-locations have been reported since the terminal device last transmitted an indication of its absolute coordinates, or in response to a request from the network, to help reduce the risk of an accumulation of errors arising from integrating a series of delta-location reports.

Approaches in accordance with some example implementations may help reduce the need for the terminal device to transit to a radio resource control (RRC) connected state/mode to transmit its location report by instead adopting a configured grant approach whereby the terminal device may transmit a pre-defined preamble on radio transmission resources that have been previously configured for the purpose. The transmitted preamble may, for example, be selected from among a plurality of potential pre-defined preambles in a way that identifies the terminal device and provides an indication of the (delta) location being reported, or it might only identify the terminal device and be followed by further signal or another predefined preamble carrying an indication of the location data being reported (absolute or relative to a previous location).

In accordance with some example implementations the transmitted location data might comprises an indication of an angular direction of terminal device movement from a previously-reported location for the terminal device. The resolution/granularity with which the angular direction is reported may be configured having regard to the extent to which coverage areas overlap, for example based on the typical characteristic length, width or area of the spot-beam footprint overlap regions for the communication system.

Thus, approaches in accordance with certain embodiments of the disclosure can therefore help reduce the frequency of terminal device location reports which are used for mobility management in a NTN, which can help reduce the use of terminal device power and transmission resources. Furthermore, approaches in accordance with certain embodiments of the disclosure can help to reduce the time it takes to transmit a location report by avoiding a transition to a radio resource control connected mode of operation, which can further help to reduce the use of terminal device power and transmission resources. Approaches in accordance with certain embodiments of the disclosure can furthermore help to reduce the amount of information transmitted in a location report, which can still further help to reduce the use of terminal device power and transmission resources.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system comprising the terminal device and a non-terrestrial network access node, wherein the method comprises the terminal device performing the steps of:
- determining a first location for the terminal device;
- transmitting location report signalling indicating the first location;
- determining a second location for the terminal device;
- determining whether or not a distance between the first location and the second location is more than a predefined threshold distance, and if so transmitting location report signalling indicating the second location.

Paragraph 2. The method of paragraph 1, wherein the location report signalling indicating the s location comprises an indication of a difference between the first location and the second location.

Paragraph 3. The method of paragraph 1 or 2, wherein the location report signalling indicating the second location comprises an indication of a direction from the first location to the second location.

Paragraph 4. The method of any of paragraphs 1 to 3, wherein the predefined threshold distance is established by the terminal device from one or more of: (i) configuration information received in system information broadcast, SIB, signalling; (ii) configuration information received in radio resource control, RRC, signalling or long term evolution positioning protocol signalling (iii) an operating standard for the terminal device.

Paragraph 5. The method of any of paragraphs 1 to 4, wherein the predefined threshold distance is in a range selected from the group comprising: between 1 km and 25 km; between 5 km and 15 km; and between 8 km and 12 km.

Paragraph 6. The method of any of paragraphs 1 to 5, wherein the location report signalling indicating the second location is transmitted when the terminal device is not in a radio resource control, RRC, connected mode.

Paragraph 7. The method of paragraph 6, wherein the location report signalling indicating the second location comprises a preamble sequence selected from a plurality of predefined potential preamble sequences, wherein the preamble sequence is selected based on the second location.

Paragraph 8. The method of paragraph 7, wherein respective ones of the plurality of predefined potential preamble sequences are associated with different directions, and wherein the preamble sequence is selected based on a correspondence between the direction from the first location to the second location and the different directions associated with the plurality of predefined potential preamble sequences.

Paragraph 9. The method of paragraph 8, wherein the number of the plurality of predefined potential preamble sequences are selected in the network according to the characteristic extent of overlap of neighbouring communication cells in the network.

Paragraph 10. The method of any of paragraphs 7 to 9, wherein respective ones of the plurality of predefined potential preamble sequences correspond with different cyclic shifts of a single preamble sequence.

Paragraph 11. The method of any of paragraphs 6 to 10, wherein the location report signalling indicating the second location is transmitted using radio resources which are predefined for location reporting.

Paragraph 12. The method of paragraph 6, wherein the location report signalling indicating the second location comprises a first message transmitted by the terminal device comprising a preamble sequence and a subsequent message transmitted by the terminal device indicating the second location, wherein the subsequent message transmitted by the terminal device is transmitted on radio resources indicted in a radio resource allocation message received by the terminal device in response to transmitting the first message.

Paragraph 13. The method of paragraph 12, wherein the preamble sequence comprises an indication of an identifier for the terminal device.

Paragraph 14. The method of any of paragraphs 1 to 13, wherein the location report signalling indicating the second location is transmitted using long term evolution positioning protocol, LPP, signalling or using a medium access control, MAC, control element, CE.

Paragraph 15. The method of any of paragraphs 1 to 14, further comprising the terminal device receiving acknowledgement signalling indicating the location report signalling indicating the second location has been received.

Paragraph 16. The method of any of paragraphs 1 to 15, further comprising the terminal device receiving signalling indicating a change to the predefined threshold distance to be used for future location reporting in response to transmitting the location report signalling indicating the second location.

Paragraph 17. The method of any of paragraphs 1 to 16, wherein the second location report signalling comprises an indication the second location report signalling is intended for a serving mobile location center in the wireless telecommunications system Paragraph 18. A terminal device for use in a wireless telecommunications system comprising the terminal device and a non-terrestrial network access node, wherein the terminal device comprises controller circuitry and transceiver circuitry configured to operate together such that the terminal device is operable to:
- determine a first location for the terminal device;
- transmit signalling indicating the first location;
- determine a second location for the terminal device;
- determine whether or not a distance between the first location and the second location is more than a predefined threshold distance, and if so transmit signalling indicating the second location.

Paragraph 19. Circuitry for a terminal device for use in a wireless telecommunications system comprising the terminal device and a non-terrestrial network access node, wherein the circuitry comprises controller circuitry and transceiver circuitry configured to operate together such that the circuitry is operable to:
- determine a first location for the terminal device;
- transmit signalling indicating the first location;
- determine a second location for the terminal device;
- determine whether or not a distance between the first location and the second location is more than a predefined threshold distance, and if so transmit signalling indicating the second location.

Paragraph 20. A method of operating network infrastructure equipment comprising a non-terrestrial network access node in a wireless telecommunications system comprising the network infrastructure equipment and a terminal device, wherein the method comprises the network infrastructure equipment performing the steps of:
  receiving signalling indicating a first location for the terminal device;
  using the first location for the terminal device for mobility management for the terminal device;
  receiving signalling indicating the terminal device has moved from the first location by more than a predefined threshold distance and determining a second location for the terminal device therefrom; and
  subsequently using the second location for the terminal device for mobility management for the terminal device.

Paragraph 21. The method of paragraph 20, wherein the location report signalling indicating the terminal device has moved from the first location by more than a predefined threshold distance is received when the terminal device is not in a radio resource control, RRC, connected mode.

Paragraph 22. The method of paragraph 21, wherein the location report signalling indicating the terminal device has moved from the first location by more than a predefined threshold distance comprises a preamble sequence selected from a plurality of predefined potential preamble sequences.

Paragraph 23. The method of paragraph 22, wherein respective ones of the plurality of predefined potential preamble sequences are associated with different directions, and wherein a direction from the first location to the second location is determined according to which of the plurality of predefined potential preamble sequences is received.

Paragraph 24. The method of paragraph 23, wherein the number of the plurality of predefined potential preamble sequences are selected in the network according to the characteristic extent of overlap of neighbouring communication cells in the network.

Paragraph 25. Network infrastructure equipment comprising a non-terrestrial network access node in a wireless telecommunications system comprising the network infrastructure equipment and a terminal device, wherein the network infrastructure equipment comprises controller circuitry and transceiver circuitry configured to operate together such that the network infrastructure equipment is operable to:
  receive signalling indicating a first location for the terminal device;
  use the first location for the terminal device for mobility management for the terminal device;
  receive signalling indicating the terminal device has moved from the first location by more than a predefined threshold distance and determining a second location for the terminal device therefrom; and
  subsequently use the second location for the terminal device for mobility management for the terminal device.

Paragraph 26. Circuitry for network infrastructure equipment comprising a non-terrestrial network access node in a wireless telecommunications system comprising the network infrastructure equipment and a terminal device, wherein the circuitry comprises controller circuitry and transceiver circuitry configured to operate together such that the circuitry is operable to:
  receive signalling indicating a first location for the terminal device;
  use the first location for the terminal device for mobility management for the terminal device;
  receive signalling indicating the terminal device has moved from the first location by more than a predefined threshold distance and determining a second location for the terminal device therefrom; and
  subsequently use the second location for the terminal device for mobility management for the terminal device.

REFERENCES

[1] 3GPP TR 38.811 "Study on New Radio (NR) to support non terrestrial networks (Release 15)", December 2017
[2] Holma H. and Toskala A, "LTE for UMTS OFDMA and SC-FDMA based radio access", John Wiley and Sons, 2009

The invention claimed is:

1. A method of operating a terminal device in a wireless telecommunications system comprising the terminal device and a non-terrestrial network access node, wherein the method comprises the terminal device performing the steps of:
  determining a first location for the terminal device;
  transmitting location report signalling indicating the first location;
  determining a second location for the terminal device;
  determining whether or not a distance between the first location and the second location is more than a predefined threshold distance, and in response to the distance being more than the predefined threshold distance, transmitting location report signalling indicating the second location,
  wherein the location report signalling indicating the second location is transmitted at a time the terminal device is not in a radio resource control, RRC, connected mode.

2. The method of claim 1, wherein the location report signalling indicating the second location comprises an indication of a difference between the first location and the second location.

3. The method of claim 1, wherein the location report signalling indicating the second location comprises an indication of a direction from the first location to the second location.

4. The method of claim 1, wherein the predefined threshold distance is established by the terminal device from one or more of (i) configuration information received in system information broadcast, SIB, signalling; (ii) configuration information received in radio resource control, RRC, signalling or long term evolution positioning protocol signalling (iii) an operating standard for the terminal device.

5. The method of claim 1, wherein the predefined threshold distance is in a range selected from the group comprising: between 1 km and 25 km; between 5 km and 15 km; and between 8 km and 12 km.

6. The method of claim 1, wherein the location report signalling indicating the second location comprises a preamble sequence selected from a plurality of predefined potential preamble sequences, wherein the preamble sequence is selected based on the second location.

7. The method of claim 6, wherein respective ones of the plurality of predefined potential preamble sequences are associated with different directions, and wherein the preamble sequence is selected based on a correspondence between the direction from the first location to the second location and the different directions associated with the plurality of predefined potential preamble sequences.

8. The method of claim 7, wherein the number of the plurality of predefined potential preamble sequences are selected in the network according to the characteristic extent of overlap of neighbouring communication cells in the network.

9. The method of claim 6, wherein respective ones of the plurality of predefined potential preamble sequences correspond with different cyclic shifts of a single preamble sequence.

10. The method of claim 1, wherein the location report signalling indicating the second location is transmitted using radio resources which are predefined for location reporting.

11. The method of claim 1, wherein the location report signalling indicating the second location comprises a first message transmitted by the terminal device comprising a preamble sequence and a subsequent message transmitted by the terminal device indicating the second location, wherein the subsequent message transmitted by the terminal device is transmitted on radio resources indicted in a radio resource allocation message received by the terminal device in response to transmitting the first message.

12. The method of claim 11, wherein the preamble sequence comprises an indication of an identifier for the terminal device.

13. The method of claim 1, wherein the location report signalling indicating the second location is transmitted using long term evolution positioning protocol, LPP, signalling or using a medium access control, MAC, control element, CE.

14. The method of claim 1, further comprising the terminal device receiving acknowledgement signalling indicating the location report signalling indicating the second location has been received.

15. The method of claim 1, further comprising the terminal device receiving signalling indicating a change to the predefined threshold distance to be used for future location reporting in response to transmitting the location report signalling indicating the second location.

16. The method of claim 1, wherein the second location report signalling comprises an indication the second location report signalling is intended for a serving mobile location center in the wireless telecommunications system.

17. A terminal device for use in a wireless telecommunications system comprising the terminal device and a non-terrestrial network access node, wherein the terminal device comprises controller circuitry and transceiver circuitry configured to operate together such that the terminal device is operable to:
  determine a first location for the terminal device;
  transmit signalling indicating the first location;
  determine a second location for the terminal device;
  determine whether or not a distance between the first location and the second location is more than a predefined threshold distance, and in response to the distance being more than the predefined threshold distance, transmit signalling indicating the second location,
  wherein the signalling indicating the second location is transmitted when the terminal device is not in a radio resource control, RRC, connected mode.

18. Network infrastructure equipment comprising a non-terrestrial network access node in a wireless telecommunications system comprising the network infrastructure equipment and a terminal device, wherein the network infrastructure equipment comprises controller circuitry and transceiver circuitry configured to operate together such that the network infrastructure equipment is operable to:
  receive signalling indicating a first location for the terminal device;
  use the first location for the terminal device for mobility management for the terminal device;
  receive signalling indicating the terminal device has moved from the first location by more than a predefined threshold distance and determining a second location for the terminal device therefrom, wherein the signalling indicating the second location is transmitted by the terminal device when the terminal device is not in a radio resource control, RRC, connected mode; and
  subsequently use the second location for the terminal device for mobility management for the terminal device.

* * * * *